(12) United States Patent
Nishimura

(10) Patent No.: US 8,683,533 B2
(45) Date of Patent: Mar. 25, 2014

(54) VIDEO TRANSMISSION APPARATUS, VIDEO TRANSMISSION SYSTEM, AND REPRODUCTION CONTROL METHOD BY VIDEO TRANSMISSION APPARATUS

(75) Inventor: Koichiro Nishimura, Kanagawa (JP)

(73) Assignee: Sony Corporation (JP)

(*) Notice: Subject to any disclaimer, the term of this patent is extended or adjusted under 35 U.S.C. 154(b) by 420 days.

(21) Appl. No.: 12/462,513

(22) Filed: Aug. 5, 2009

(65) Prior Publication Data

US 2010/0037280 A1    Feb. 11, 2010

(30) Foreign Application Priority Data

Aug. 7, 2008  (JP) ................................ P2008-204742

(51) Int. Cl.
*H04N 7/18* (2006.01)
*H04N 7/16* (2011.01)

(52) U.S. Cl.
USPC ................... 725/81; 725/62; 725/74; 725/78

(58) Field of Classification Search
None
See application file for complete search history.

(56) References Cited

U.S. PATENT DOCUMENTS

2004/0218899 A1  11/2004  Oyama et al.
2007/0060152 A1  3/2007   Sakamoto

FOREIGN PATENT DOCUMENTS

| EP | 1213926 A2 | 6/2002 |
|----|-----------|--------|
| EP | 1617614 A1 | 1/2006 |
| EP | 1617648 A1 | 1/2006 |
| EP | 1786203 A3 | 5/2007 |
| JP | 2003069534 A | 3/2003 |
| JP | 2004-336729 A | 11/2004 |
| JP | 2005175702 A | 6/2005 |
| JP | 2007134963 A | 5/2007 |
| JP | 2007158623 A | 6/2007 |
| JP | 2007281716 A | 10/2007 |
| WO | 2005057928 A1 | 6/2005 |

OTHER PUBLICATIONS

Office Action from Japanese Application No. 2008-204742, dated Apr. 27, 2010.
European Search Report EP 09167357, dated May 6, 2010.
"High—Definition Multimedia Interface Specification Version 1.3", Internet Citation, Jun. 22, 2006, XP 002391813, Retrieved from the Internet: URL:http://www.hdmi.org/download/HDMI_Spec_1.3_GM1.pdf [Retrieved on Jul. 24, 2006].
Communication pursuant to Article 94 (3) EPC, from EP Application No. 09167357.4, dated Aug. 23, 2012.

*Primary Examiner* — Nathan Flynn
*Assistant Examiner* — James R Marandi
(74) *Attorney, Agent, or Firm* — Lerner, David, Littenberg, Krumholz & Mentlik, LLP

(57) ABSTRACT

The present invention provides a video transmission apparatus including a connection terminal to which a video reproduction device is connected; a wireless transmission unit for wirelessly transmitting a video signal input through the connection terminal; a transmission quality detection unit for detecting transmission quality of when wirelessly transmitted by the wireless transmission unit; and a reproduction control unit for controlling the video reproduction device to stop the reproduction of the video when degradation of the transmission quality is detected and to resume the reproduction of the video when the transmission quality is recovered.

1 Claim, 10 Drawing Sheets

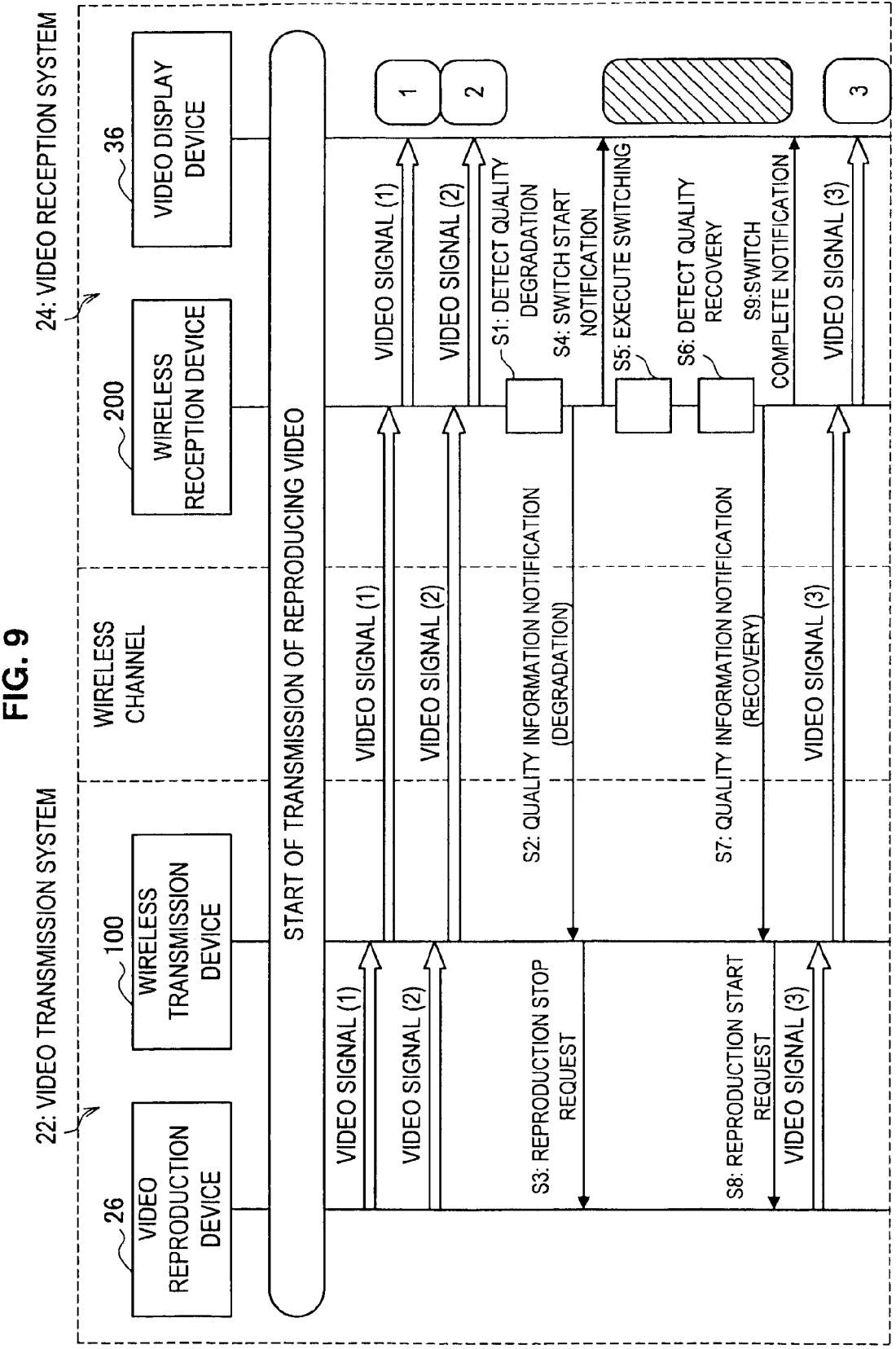

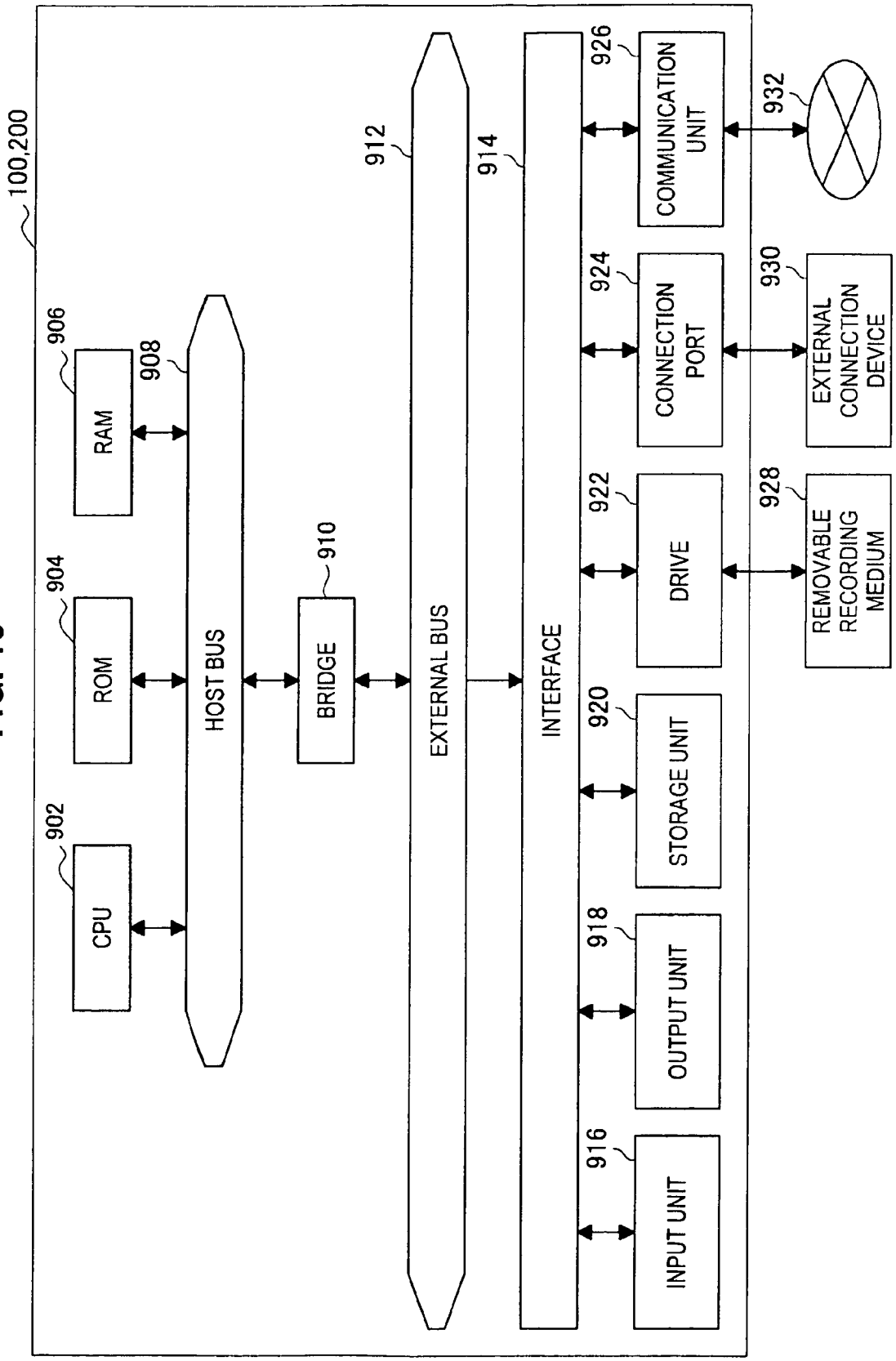

VIDEO TRANSMISSION APPARATUS, VIDEO TRANSMISSION SYSTEM, AND REPRODUCTION CONTROL METHOD BY VIDEO TRANSMISSION APPARATUS

CROSS-REFERENCE TO RELATED APPLICATION

The present application claims priority from Japanese Patent Application No. JP 2008-204742 filed in the Japanese Patent Office on Aug. 7, 2008, the entire content of which is incorporated herein by reference.

BACKGROUND OF THE INVENTION

1. Field of the Invention

The present invention relates to a video transmission. apparatus, a video transmission system, and a reproduction control method by video transmission apparatus.

2. Description of the Related Art

In recent years, scenes where the lecturer presents the material to the listener using a personal computer (PC) at the conference and public speaking are often seen. In such case, a projector wire connected to the PC is often used. The lecturer connects the PC to a DVI (Digital Visual Interface) terminal arranged at the projector by way of a cable, and delivers the speech while operating the PC at the position where the cable can reach. In some cases, an assistant that operates the PC is arranged in addition to the lecturer. In this case, the lecturer delivers the speech near the screen on which the screen content of the PC is projected.

Thus, the projector has been used to project a video on a large screen and present information to a large number of people. However, the projector is recently being widely used in general households, and a usage style of viewing movies and the like on a large screen by the projector has appeared. The background for this includes the fact that a high performance projector can be acquired relatively inexpensively, and that an environment in which a high quality video can be easily reproduced in the household by digitalization of the content is organized.

In order to use the projector, the projector and the reproduction device are obviously connected with a cable. However, in the household, the reproduction device and the recordation and reproduction device are installed near the television receiver, and the like, and are mutually connected with a cable. Thus, it is very troublesome to detach the cable and reconnect to the projector, or to move the reproduction device and the like to the vicinity of the projector. A technique of wirelessly transmitting the video signal output by the reproduction device and the like to the projector is thus given attention. Japanese Patent Application Laid-Open No. 2004-336729 discloses a technique of wirelessly transmitting video data and audio data.

SUMMARY OF THE INVENTION

However, when the transmission quality in a wireless channel degrades, videos projected by a projector may be disturbed or may not be displayed at all. Furthermore, a high quality digital video signal has large data amount and is highly coded. Thus, the video after decoding is greatly disturbed when part of the video signal is missing. Furthermore, a reproduction device continues to reproduce the video even if the video is disturbed or is not displayed at all due to degradation of the transmission quality in the wireless channel. Thus, the video scene advances while the transmission quality is degraded even if the transmission quality in the wireless channel is recovered. In such case, the user operates the reproduction device and rewinds to the video scene of before the degradation of the transmission quality. Consequently, the rewinding operation of the video scene is necessary every time the transmission quality degrades, whereby the convenience of the user greatly lowers.

The present invention addresses the above-identified, and other issues associated with conventional methods and apparatuses, and it is desirable to provide a new and improved video transmission apparatus allowing viewing automatically continuing from the video scene of before degradation without performing the rewinding operation of the video scene after the wireless transmission quality is recovered even when the wireless transmission quality is degraded and the video is disturbed and or not displayed at all when viewing the wirelessly transmitted video, a video transmission system, and a reproduction control method by the video transmission apparatus.

In order to solve the above issue, according to an embodiment of the present invention, there is provided a video transmission apparatus including a connection terminal to which a video reproduction device is connected; a wireless transmission unit for wirelessly transmitting a video signal input through the connection terminal; a transmission quality detection unit for detecting transmission quality of when wirelessly transmitted by the wireless transmission unit; and a reproduction control unit for controlling the video reproduction device to stop the reproduction of the video when degradation of the transmission quality is detected and to resume the reproduction of the video when the transmission quality is recovered.

As mentioned above, the video transmission apparatus includes a connection terminal to which a video reproduction device is connected. The video transmission apparatus wirelessly transmits a video signal input through the connection terminal by using the wireless transmission unit.

The video transmission apparatus detects transmission quality of when wirelessly transmitted by the wireless transmission unit, by using the transmission quality detection unit. The video transmission apparatus control the video reproduction device, by using a reproduction control unit, to stop the reproduction of the video when degradation of the transmission quality is detected and to resume the reproduction of the video when the transmission quality is recovered.

The video transmission apparatus may further include a quality information acquiring unit for acquiring information of the transmission quality detected at a wireless transmitting destination of the video signal from the wireless transmitting destination, wherein the transmission quality detection unit detects the transmission quality based on the information of the transmission quality acquired by the quality information acquiring unit.

The quality information acquiring unit may acquire information indicating quality degradation when the transmission quality degrades to lower than a predetermined quality, and acquires information indicating quality recovery when the transmission quality recovers to higher than or equal to the predetermined quality.

The quality information acquiring unit may acquire information indicating the quality degradation when video quality of after decoding is lower than a predetermined quality at the wireless transmitting destination of the video signal, and acquire information indicating the quality recovery when the video quality of higher than or equal to the predetermined quality is recovered.

The transmission quality may be determined based on an error rate in time of demodulation or in time of decoding detected at a transmitting destination of the video signal.

In order to solve the above issue, according to another embodiment of the present invention, there is provided a video transmission system having: a video transmission apparatus including, a connection terminal to which a video reproduction device is connected, a wireless transmission unit for wirelessly transmitting a video signal input through the connection terminal, a quality information acquiring unit for acquiring quality information indicating wireless transmission quality of the video signal, and a reproduction control unit for controlling the video reproduction device to stop the reproduction of the video when degradation of the transmission quality is detected and to resume the reproduction of the video when the transmission quality is recovered based on the quality information acquired by the quality information acquiring unit; and a video reception device including, a wireless reception unit for receiving the video signal wirelessly transmitted from the video transmission apparatus, a decode unit for decoding the video signal received by the wireless reception unit, a quality determination unit for determining video quality of the video signal decoded by the decode unit, and a quality information providing unit for providing the determination result of the quality determination unit as the quality information.

As mentioned above, a video transmission system includes the video transmission apparatus and the video reception device.

The video transmission apparatus includes a connection terminal to which a video reproduction device is connected, a wireless transmission unit for wirelessly transmitting a video signal input through the connection terminal, a quality information acquiring unit for acquiring quality information indicating wireless transmission quality of the video signal, and a reproduction control unit for controlling the video reproduction device to stop the reproduction of the video when degradation of the transmission quality is detected and to resume the reproduction of the video when the transmission quality is recovered based on the quality information acquired by the quality information acquiring unit.

The video reception device includes a wireless reception unit for receiving the video signal wirelessly transmitted from the video transmission apparatus, a decode unit for decoding the video signal received by the wireless reception unit, a quality determination unit for determining video quality of the video signal decoded by the decode unit, and a quality information providing unit for providing the determination result of the quality determination unit as the quality information.

In order to solve the above issue, according to another embodiment of the present invention, there is provided a reproduction control method by a video transmission apparatus connected with a video reproduction device, the reproduction control method including the steps of: wirelessly transmitting a video signal input from the video reproduction device; detecting transmission quality when wirelessly transmitted in the wirelessly transmitting step; and controlling the video reproduction device to stop the reproduction of the video when degradation of the transmission quality is detected and to resume the reproduction of the video when the transmission quality is recovered.

As mentioned above, in the wirelessly transmitting step, a video signal is inputted from the video reproduction device. In the detecting step, transmission quality when wirelessly transmitted in the wirelessly transmitting step is detected. In the controlling step, the video reproduction device is controlled to stop the reproduction of the video when degradation of the transmission quality is detected and to resume the reproduction of the video when the transmission quality is recovered.

In order to solve the above issue, according to another embodiment of the present invention, there is provided a program for causing a computer to realize the functions of the video transmission apparatus. There is also provided a computer readable recording medium recorded with the program.

As described above, according to the present invention, even if the wireless transmission quality is degraded and the video is disturbed or is not displayed at all when viewing the wirelessly transmitted video, viewing can be carried out automatically continuing from the video scene of before the degradation without performing the rewinding operation of the video scene after the wireless transmission quality is recovered.

BRIEF DESCRIPTION OF THE DRAWINGS

FIG. 9 shows a flow of a video transmission process according to the embodiment; and FIG. 10 shows one example of hardware configuration of the wireless transmission device and the wireless reception device according to the embodiment.

DETAILED DESCRIPTION OF THE PREFERRED EMBODIMENTS

Figure 1:
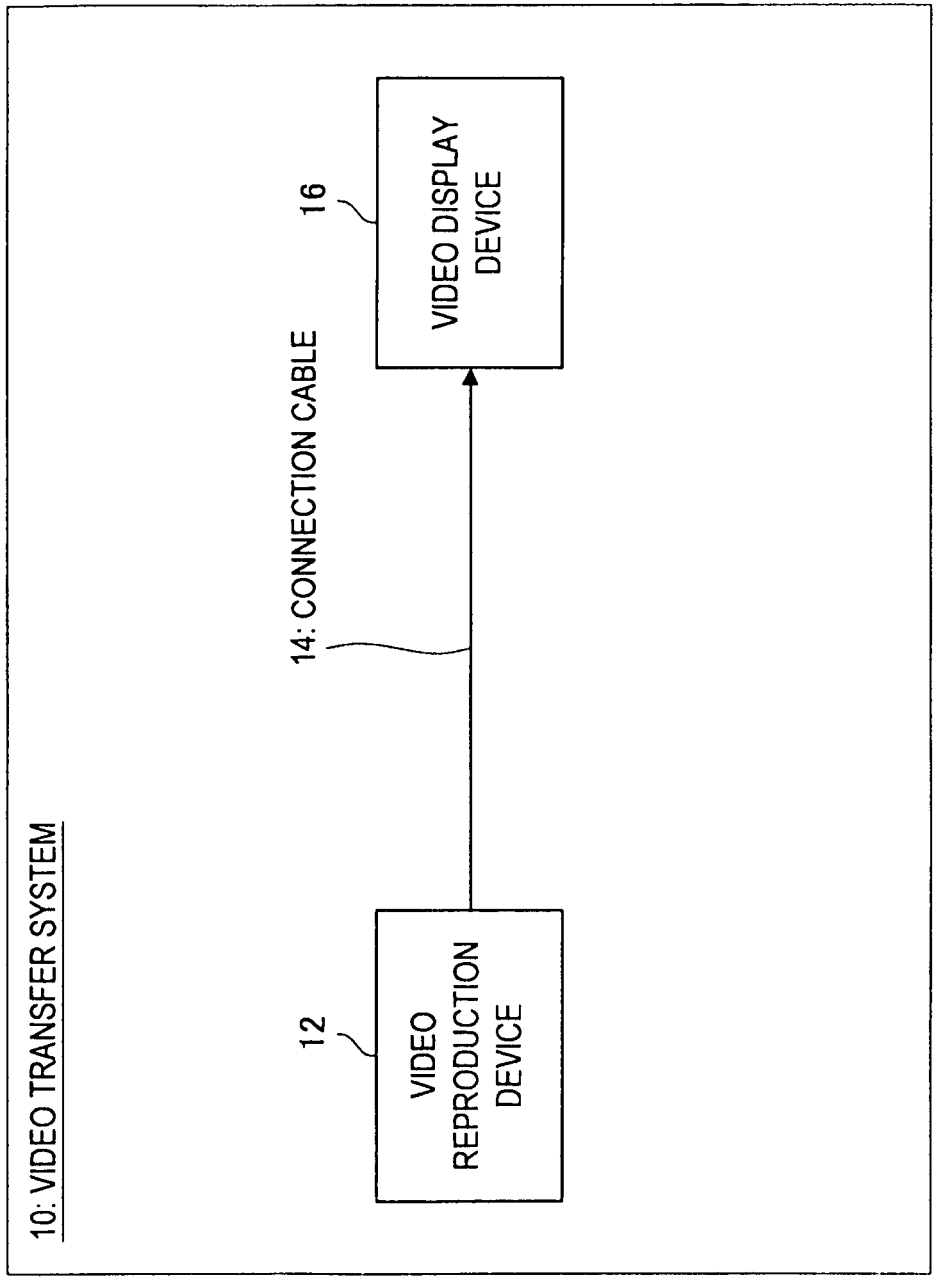
FIG. 1 shows one configuration example of a video transmission system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Regarding Flow of Description]

The flow of description will be briefly described below. First, a configuration of a video transmission system for transmitting a video signal using a connection cable will be described with reference to FIG. 1. Next, a configuration of a video transmission system for transmitting a video signal using wireless communication will be described with reference to FIG. 2. A video transmission method for transmitting a video signal using wireless communication will then be described with reference to FIGS. 3 to 5. In the description, the technical issue in the relevant video transmission method will be described.

In view of the above technical issue, a configuration of the video transmission system according to the present embodiment will be described with reference to FIG. 6. A function configuration of a wireless transmission device included in the video transmission system of the present embodiment will be described with reference to FIG. 7. Then, a function configuration of a wireless reception device included in the video transmission system of the present embodiment will be described with reference to FIG. 8. A video transmission method according to the present embodiment will be described with reference to FIG. 9. A hardware configuration capable of realizing the main function of the wireless transmission device and the wireless reception device of the present embodiment will be described thereafter. Lastly, the technical idea of the embodiment will be summarized, and the effects obtained from the technical idea will be briefly described.

[Organization of Issues]

First, prior to describing one embodiment of the present invention in detail, the issues to be solved by the present embodiment will be briefly summarized.

(Regarding Video Transmission System 10 of Wire Connection)

First, the configuration of a video transmission system 10 for transmitting a video signal using a connection cable 14 will be described with reference to FIG. 1.

As shown in FIG. 1, the video transmission system 10 is configured by a video reproduction device 12, the connection cable 14, and a video display device 16.

The video reproduction device 12 reads out and reproduces video data from a recording media recorded with the video data, and outputs the reproduced video signal. An optical recording medium, a magnetic optical recording medium, a magnetic recoding medium, a semiconductor recording medium, or the like is used for the recording media. BD (Blu-ray Disc), DVD (Digital Versatile Disk), or the like is used for the optical recording medium. HDD (Hard Disk Drive), or the like is used for the magnetic recording medium.

The video reproduction device 12 may be a reproduction dedicated device or may be a recordation and reproduction device. The video reproduction device 12 may be configured to receive broadcast data and output the same as a video signal. Furthermore, the video reproduction device 12 may be a PC, game machine, or the like. The video reproduction device 12 is connected to the video display device 16 by way of the connection cable 14. Thus, the video signal output from the video reproduction device 12 is input to the video display device 16 through the connection cable 14.

HDMI cable, DVI cable, or the like may be used for the connection cable 14. When the video signal is input from the video reproduction device 12 to the video display device 16 via the connection cable 14, the video display device 16 displays the input video signal on a display screen. A television receiver, projector, or the like may be used for the video display device 16. A monitor or the like may obviously be used for the video display device 16.

The video reproduction device 12 and the video display device 16 are often wire connected by the connection cable 14 as in the video transmission system 10. When wire connected, the video signal output from the video reproduction device 12 towards the video display device 16 will not be lost unless the connection cable 14 is disconnected. In other words, the configuration of the video transmission system 10 excels in stably transmitting the video signal.

However, since the video transmission system 10 has the video reproduction device 12 and the video display device 16 connected by the connection cable 14 having a finite length, the degree of freedom regarding the relative positional relationship of the two devices is low. In other words, there is a technical issue in that the video display device 16 is difficult to move to a position distant from the video reproduction device 12. A technique of wirelessly transmitting the video signal is developed in order to solve such technical issue.

(Regarding Video Transmission System 20 of Wireless Connection)

The configuration of the video transmission system 20 for wirelessly transmitting the video signal will now be described with reference to FIG. 2.

Figure 2:
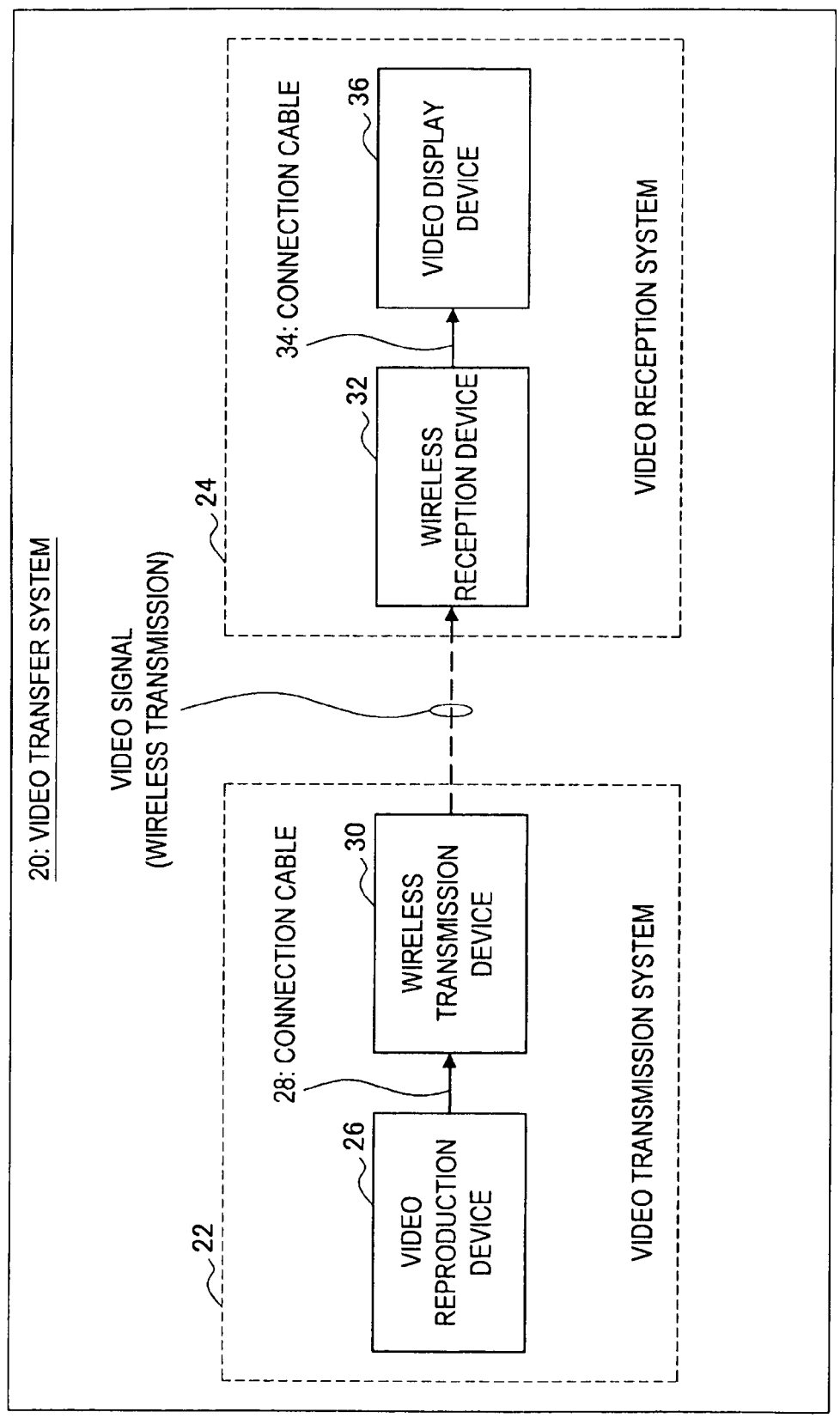
FIG. 2 shows one configuration example of a video transmission system.

As shown in FIG. 2, the video transmission system 20 is configured by a video transmission system 22 and a video reception system 24. The video transmission system 22 is configured by a video reproduction device 26, a connection cable 28, and a wireless transmission device 30. The video reception system 24 is configured by a wireless reception device 32, a connection cable 34, and a video display device 36.

The video reproduction device 26 reads out and reproduces video data from a recording media recorded with the video data, and outputs the reproduced video signal. The video reproduction device 26 may be configured to receive broadcast data and output the video data as a video signal. The video reproduction device 26 is connected to the wireless transmission device 30 by way of the connection cable 28. Thus, the video signal output from the video reproduction device 26 is input to the wireless transmission device 30 through the connection cable 28.

The wireless transmission device 30 wirelessly transmits the video signal input from the video reproduction device 26 via the connection cable 28. The video signal wirelessly transmitted by the wireless transmission device 30 is received by the wireless reception device 32. The wireless reception device 32 is connected to the video display device 36 by way of the connection cable 34. Thus, the video signal wirelessly transmitted from the wireless transmission device 30 to the wireless reception device 32 is input to the video display device 36 via the connection cable 34.

When the video signal is input from the wireless reception device 32 to the video display device 36 via the connection cable 34, the video display device 36 displays the input video signal on the display screen. A television receiver, projector, or the like may be used for the video display device 36. A display for PC or the like may obviously be used for the video display device 36. A wired cable capable of transmitting HDMI signal, component signal, composite signal, and the like may be used for the connection cables 28, 34.

The video signal can be wirelessly transmitted by arranging the wireless transmission device 30 and the wireless reception device 32 between the video reproduction device 26 and the video display device 36 as in the video transmission system 20. The technical issue of the video transmission system 10 described above is solved by such configuration. In other words, since the wireless transmission device 30 and the wireless reception device 32 are wireless connected, the relative position between the video transmission system 22 and the video reception system 24 can be arbitrarily changed as long as it is in the range the electric wave can be reached. As a result, the degree of freedom regarding the installation of the video reproduction device 26 and the video display device 36 significantly enhances.

However, since wireless transmission is performed between the wireless transmission device 30 and the wireless reception device 32, the video may not be displayed on the video display device 36 or the displayed video may be disturbed if the transmission quality is degraded. The relevant technical issue will be described in more detail below.

(Flow of Transmission Process by Video Transmission System 20)

Figure 3:
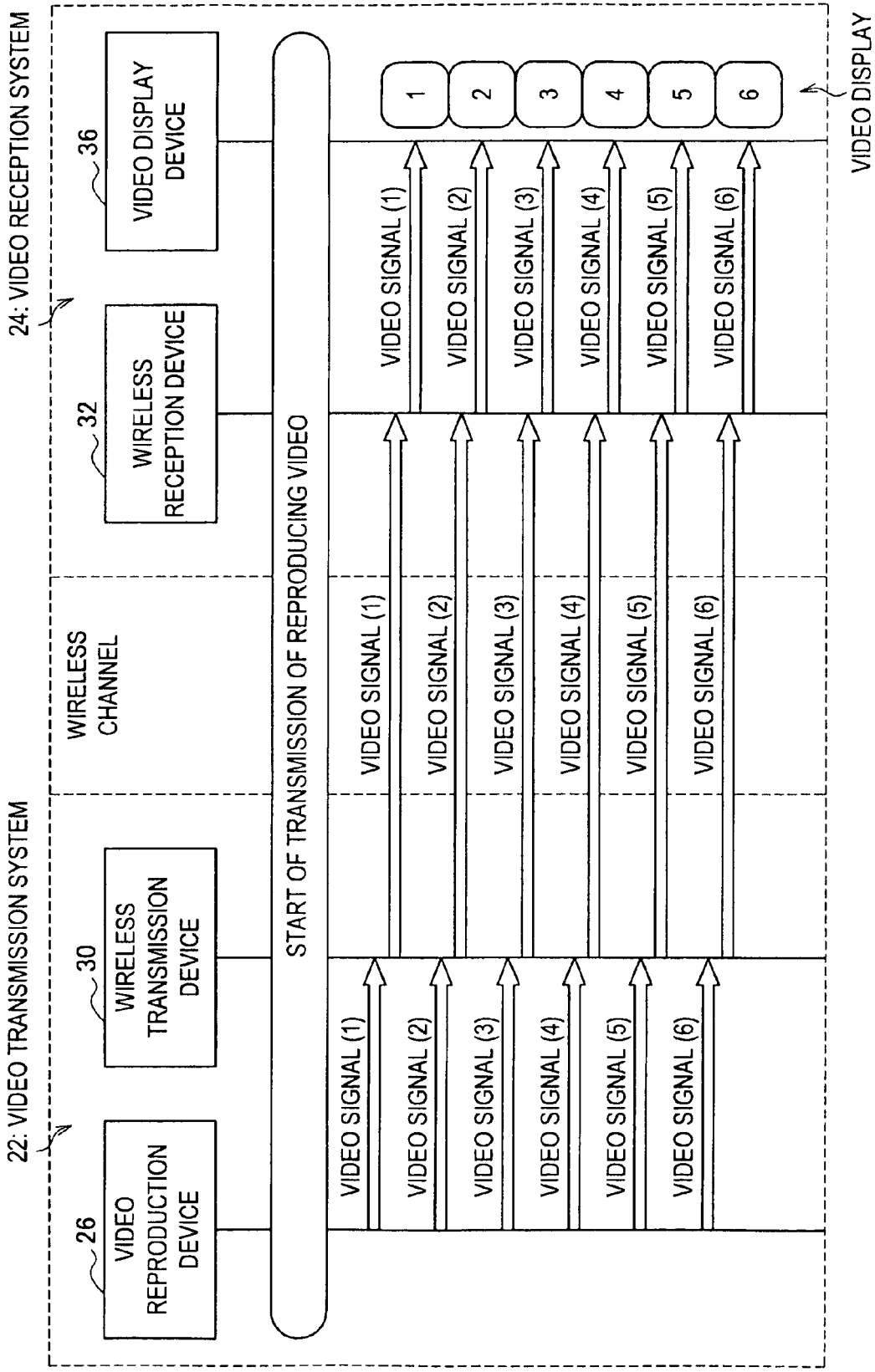
FIG. 3 shows a flow of a video transmission process in the video transmission system.
Figure 4:
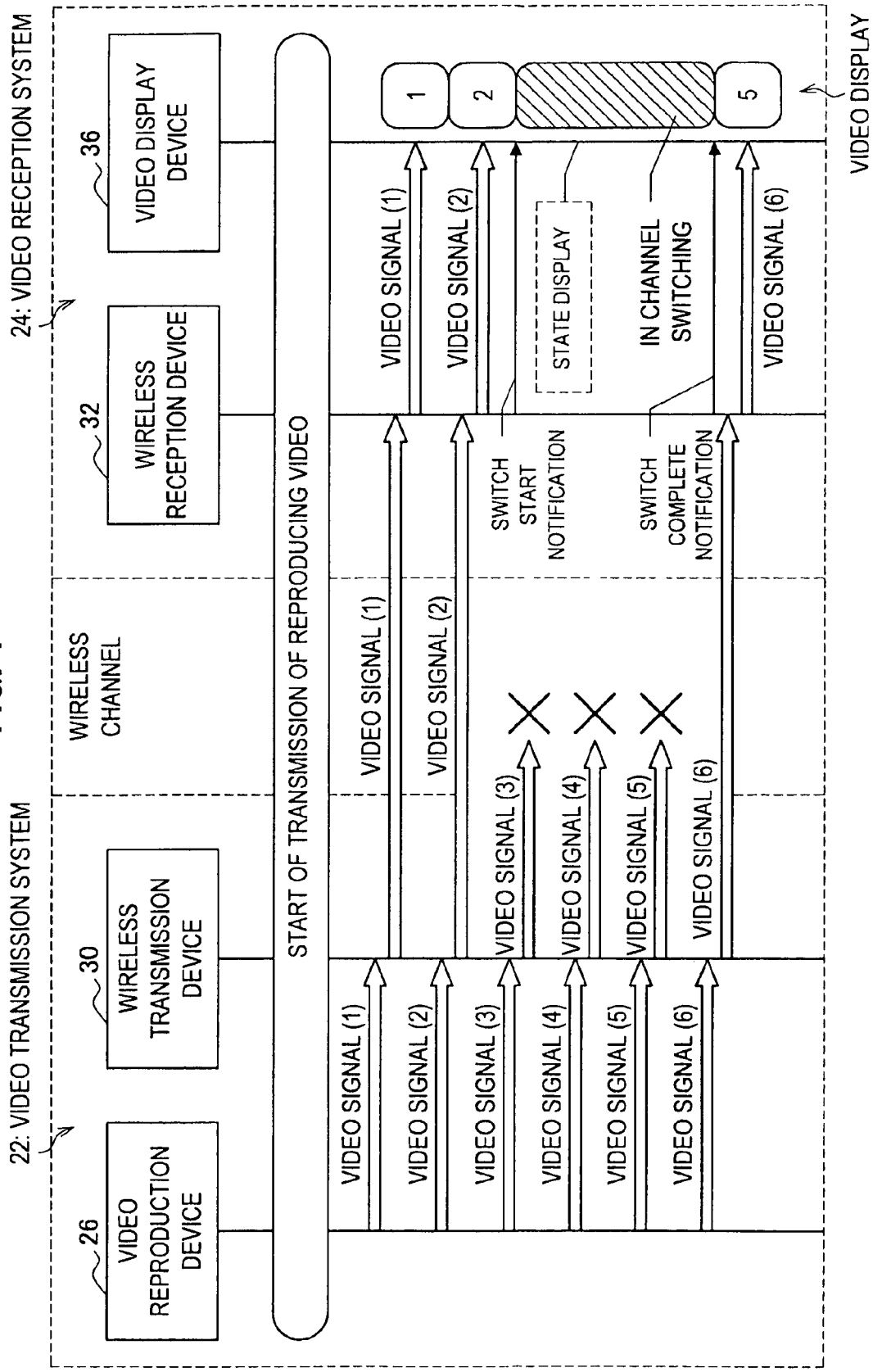
FIG. 4 shows a flow of the video transmission process in the video transmission system.
Figure 5:
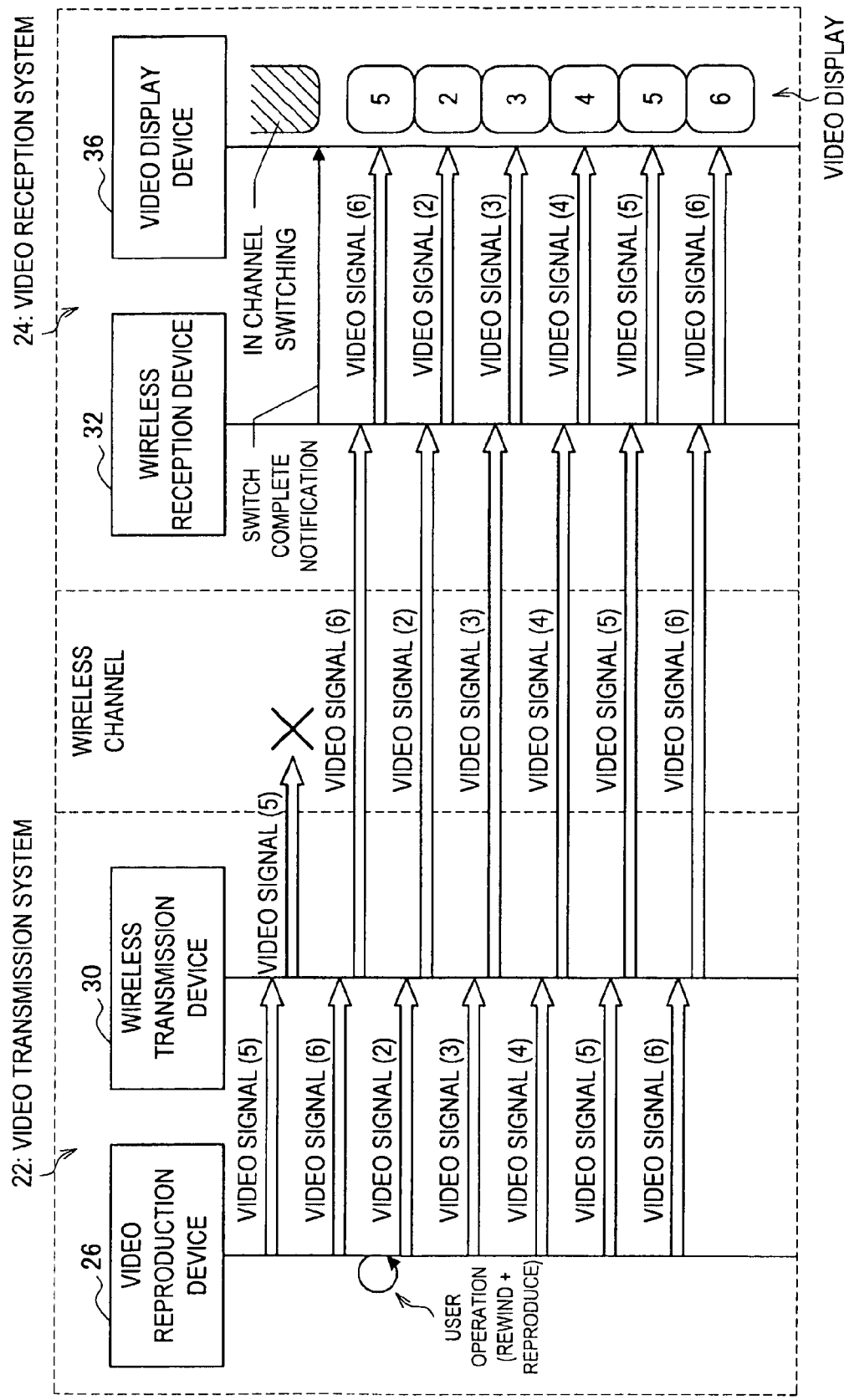
FIG. 5 shows a flow of the video transmission process in the video transmission system.

The flow of transmission process by the video transmission system 20 will be described first with reference to FIGS. 3 to 5. FIG. 3 shows the flow of transmission process by the video transmission system 20 when the wireless transmission quality is not degraded. FIGS. 4 and 5 show the flow of transmission process by the video transmission system 20 when the wireless transmission quality is degraded.

(When Transmission Quality is Satisfactory)

Reference is made to FIG. 3. First, when the transmission process of the reproducing video starts, the video signal is transmitted from the video reproduction device 26 to the wireless transmission device 30. As described above, the video reproduction device 26 and the wireless transmission device 30 are wire connected by the connection cable 28. Thus, the video signal is not interrupted at this stage. That is, the video signals (video signal (1), . . . , video signal (6)) are continuously transmitted from the video reproduction device 26 to the wireless transmission device 30, as shown in FIG. 3.

When the video signal is transmitted from the video reproduction device 26 to the wireless transmission device 30, the wireless transmission device 30 wirelessly transmits the video signal to the wireless reception device 32. The wireless transmission device 30 is continuously input with the video signals (video signal (1), . . . , video signal (6)), as described above. Thus, if the transmission quality of the wireless channel is satisfactory, the video signals (video signal (1), . . . , video signal (6)) are continuously wirelessly transmitted between the wireless transmission device 30 and the wireless reception device 32.

The frequency channel used in wirelessly transmitting the video signal may be changed for every video signal. The frequency channel having satisfactory channel characteristics is normally selected from a plurality of frequency channels set in advance when wirelessly transmitting the signal. For instance, the wireless transmission device 30 detects the usage state of each frequency channel at the time point of transmitting the video signal (1), selects the frequency channel (1) having a more satisfactory channel characteristics, and transmits the video signal (1). Each video signal is wirelessly transmitted to the wireless reception device 32 in such manner.

The video signal wirelessly transmitted from the wireless transmission device 30 to the wireless reception device 32 is transmitted from the wireless reception device 32 to the video display device 36. As described above, the wireless reception device 32 and the video display device 36 are wire connected by the connection cable 34. Thus, the video signal is not interrupted at this stage. As in this example, the video signals (video signal (1), . . . , video signal (6)) are continuously transmitted to the wireless reception device 32, and input to the video display device 36 via the connection cable 34 when the transmission quality of the wireless channel is satisfactory.

When the transmission quality of the wireless channel is maintained at the satisfactory state and the video signals (video signal (1), . . . , video signal (6)) are continuously transmitted to the video display device 36, the user can view the video without issue. However, when the transmission quality degrades, the video being viewed is interrupted in the middle as hereinafter described.

(When Transmission Quality is Degraded)

Reference is made to FIG. 4. First, when the transmission process of the reproducing video starts, the video signal is transmitted from the video reproduction device 26 to the wireless transmission device 30. As described above, the video reproduction device 26 and the wireless transmission device 30 are wire connected by the connection cable 28. Thus, the video signal is not interrupted at this stage. That is, the video signals (video signal (1), . . . , video signal (6)) are continuously transmitted from the video reproduction device 26 to the wireless transmission device 30, as shown in FIG. 4.

When the video signal is transmitted from the video reproduction device 26 to the wireless transmission device 30, the wireless transmission device 30 wirelessly transmits the video signal to the wireless reception device 32. The wireless transmission device 30 is continuously input with the video signals (video signal (1), . . . , video signal (6)), as described above. Thus, if the transmission quality of the wireless channel is satisfactory, the video signals (video signal (1), . . . , video signal (6)) are continuously wirelessly transmitted between the wireless transmission device 30 and the wireless reception device 32.

However, in the example of FIG. 4, the transmission quality of the wireless channel is degraded at the stage the video signal (3) is transmitted from the wireless transmission device 30, and the video signal (3), . . . , video signal (5) do not reach the wireless reception device 32. When such state occurs, the frequency channel between the wireless transmission device 30 and the wireless reception device 32 is switched. In this case, the wireless reception device 32 transmits a switch start notification to the video display device 36. The switch start notification is a state notification signal for notifying that the switch of the frequency channel has started.

When the switch start notification is transmitted from the wireless reception device 32 to the video display device 36, information indicating that the frequency channel is being switched is displayed on the display screen at the video display device 36. When such information is displayed on the video display device 36, the user can recognize that the video signal has not reached the wireless reception device 32. However, the user waits until the switching process of the frequency channel is completed in front of the video display device 36 until a frequency channel of satisfactory channel characteristics is selected.

After the switching process to the frequency channel of satisfactory channel characteristics is completed, a switch complete notification is transmitted from the wireless reception device 32 to the video display device 36. The switch complete notification is a state notification signal for notifying that the switch of the frequency channel has completed. At this stage, the video signal (video signal (6)) is transmitted from the wireless transmission device 30 to the wireless reception device 32 using the frequency channel having satisfactory channel characteristics. The video signal transmitted from the wireless transmission device 30 to the wireless reception device 32 is transmitted from the wireless reception device 32 to the video display device 36.

After the switch complete notification is transmitted from the wireless reception device 32 to the video display device 36, the video display device 36 cancels the display of information indicating that the channel is being switched and displays the video signal transmitted from the wireless reception device 32 on the display screen. Thereafter, the video signal reproduced by the video reproduction device 26 is continuously transmitted to the video display device 36 via the wireless transmission device 30 and the wireless reception device 32 as long as the transmission quality of the wireless channel is satisfactory. If the transmission quality of the wireless channel degrades, the frequency channel used for the wireless transmission between the wireless transmission device 30 and the wireless reception device 32 is switched, similar to the above.

The video signal is continuously wirelessly transmitted without the user performing a special setting change and the like by automatically switching the frequency channel used for the wireless transmission of the video signal when the transmission quality of the wireless channel degrades. The user can recognize the transmission state of the video signal by the display of the information at the video display device 36 while the switching process of the frequency channel is proceeding.

However, while the frequency channel is being switched, the video signal is continuously transmitted from the video reproduction device 26 to the wireless transmission device 30. Thus, the video scene advances every second during the switching process of the frequency channel. As a result, after the switching process of the frequency channel, the video scene displayed at the video display device 36 is somewhat advanced from the video scene of before the switching process of the frequency channel. In other words, the user may miss the video scene reproduced while the switching process of the frequency channel is proceeding.

In such case, the user operates the video reproduction device 26 to rewind the video scene to before the switching process of the frequency channel, as shown in FIG. 5. FIG. 5 shows a processing sequence of after the time point at which the switch complete notification is transmitted from the wireless reception device 32 to the video display device 36 in FIG. 4. As shown in FIG. 5, the video signal (video signal (6)) is transmitted from the wireless transmission device 30 to the wireless reception device 32 when the switching process of the frequency channel is completed. The user performs the rewinding operation of the video scene up to the time point of before the switching process of the frequency channel with respect to the video reproduction device 26.

After the video scene is rewound by the user operation, the video signals (video signal (2), . . . , video signal (6)) starting from the rewound video scene are continuously transmitted from the video reproduction device 26 to the wireless transmission device 30. When the video signal is transmitted from the video reproduction device 26 to the wireless transmission device 30, the wireless transmission device 30 wirelessly transmits the video signal to the wireless reception device 32. If the transmission quality of the wireless channel is satisfactory, the video signals (video signal (2), . . . , video signal (6)) are continuously wirelessly transmitted between the wireless transmission device 30 and the wireless reception device 32.

As described above, the video signal transmitted from the wireless transmission device 30 to the wireless reception device 32 is interrupted when the transmission quality of the wireless channel degrades. In a wireless environment, the degradation of the transmission quality is inevitable due to the various reasons. Thus, when the transmission quality of the wireless channel degrades, control is performed such that the transmission quality of the wireless channel is maintained at a satisfactory state as much as possible by executing the switching process of the frequency channel, and the like, similar to the above.

Considering especially the wireless transmission of the video signal, devisal of controlling the timing such that the switching timing of the frequency channel matches the V blanking period of the video display device 36 is also considered. The influence on the visual sense of the user is less likely to appear due to such devisal. However, although such devisal has effects when the switching process of the frequency channel is instantly completed, the application is difficult if the detection of the frequency channel takes a long time.

For instance, in a state a wireless device is operating in addition to the wireless transmission device 30 and the wireless reception device 32, the usage state of the frequency channel is often in a congested state. In such congested state, the detection of an effective frequency channel takes time, and furthermore, the switching process of the frequency channel may fail and the possibility of repeating retry may increase. Consequently, the period in which the video signal is not wirelessly transmitted from the wireless transmission device 30 to the wireless reception device 32 becomes long.

As described above, the video reproduction device 26 continues to reproduce the video data and continues to send the video signal to the wireless transmission device 30 even during the period in which the video signal is not wirelessly transmitted between the wireless transmission device 30 and the wireless reception device 32. Thus, the video scene advances although the video signal is not transmitted to the video display device 36. As a result, the user may miss the video scene reproduced during the period in which the transmission quality of the wireless channel is degraded and the switching process of the frequency channel is executed.

As in the example shown in FIG. 4, the uncomfortable feeling of the user may be alleviated by displaying the information such as "in frequency channel switching" on the display screen of the video display device 36. However, such information display does not fundamentally solve the technical issue related to the wireless transmission. In other words, even if such information is displayed, the rewinding operation as shown in FIG. 5 is performed. For instance, when degradation of the transmission quality occurs at a frequency of once every thirty minutes, the user viewing a movie of two and a half hours long performs the rewinding operation for about five times to view the whole movie. Thus, if the rewinding operation is frequently required, the user may not concentrate on viewing the movie and may not be able to enjoy the movie.

In the embodiment to be hereinafter described, a technique that allows viewing from the video scene of before the degradation of the transmission quality without performing the rewinding operation of the video scene after the transmission quality of the wireless channel is recovered even if the degradation of the quality of the wireless channel occurs is proposed.

<Embodiment>

One embodiment of the present invention will be described below. The present embodiment relates to a technique of wirelessly transmitting the video signal. In particular, the technique of the present embodiment allows viewing from the video scene of before the degradation of the transmission quality without performing the rewinding operation of the video scene after the transmission quality is recovered when the transmission quality of the wireless channel degrades and the video is disturbed or interrupted.

[Configuration of Video Transmission System 50]

First, the configuration of the video transmission system 50 according to the present embodiment will be described with reference to FIG. 6. The detailed description will be omitted by denoting the same reference numerals to the components having substantially the same function as the video transmission system 20.

Figure 6:
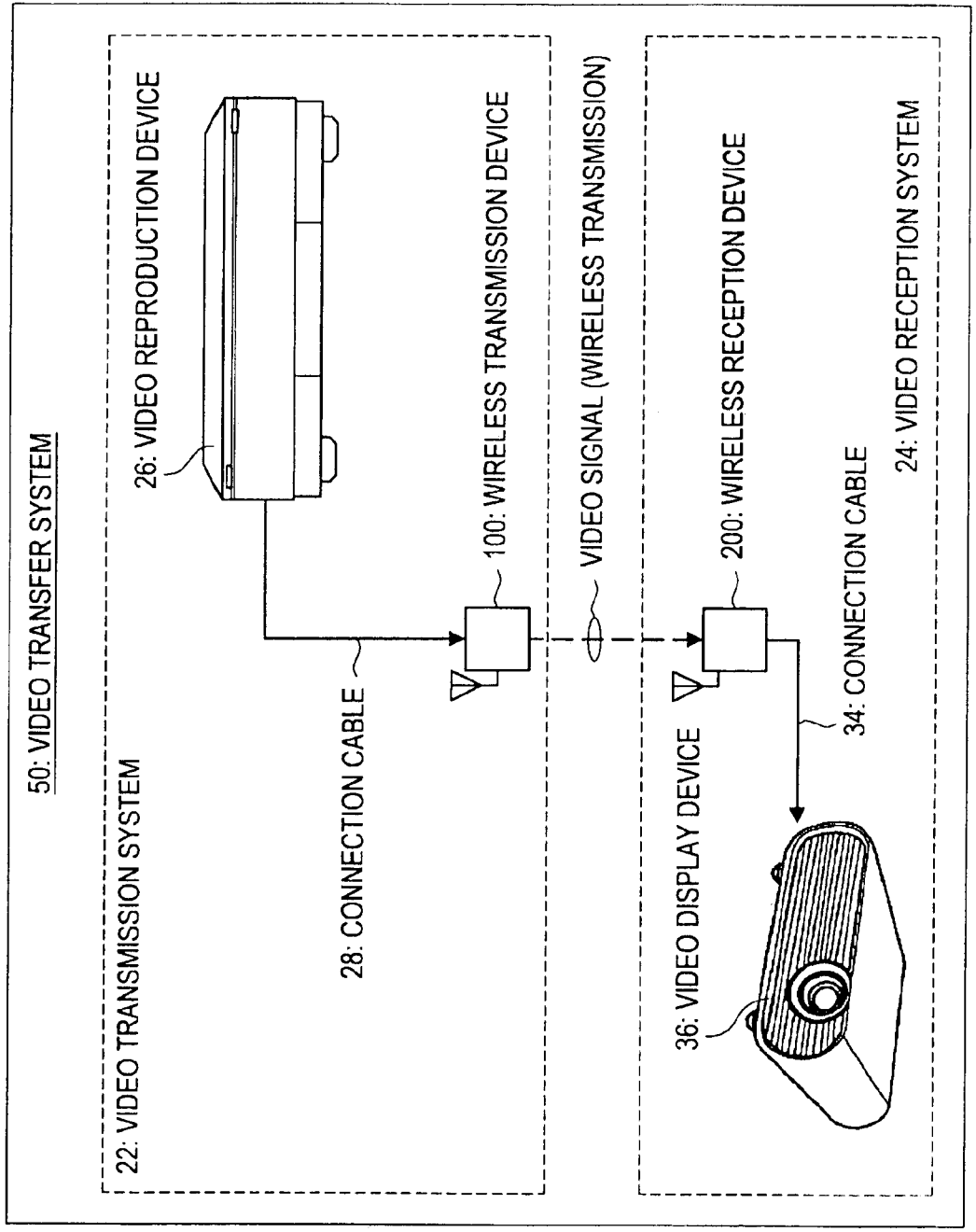
FIG. 6 shows a configuration example of a video transmission system according to one embodiment of the present invention.

As shown in FIG. 6, the video transmission system 50 is configured by the video transmission system 22 and the video reception system 24. The video transmission system 22 is configured by the video reproduction device 26, the connection cable 28, and the wireless transmission device 100. The video reception system 24 is configured by a wireless reception device 200, the connection cable 34, and the video display device 36. The main difference with the video transmission system 20 lies in the function configuration of the wireless transmission device 100 and the wireless reception device 200.

The video reproduction device 26 reads out and reproduces video data from a recording media recorded with the video data, and outputs the reproduced video signal. The video reproduction device 26 may be configured to receive broadcast data and output the video data as a video signal. The video reproduction device 26 is connected to the wireless transmission device 100 by way of the connection cable 28. Thus, the video signal output from the video reproduction device 26 is input to the wireless transmission device 100 through the connection cable 28.

The wireless transmission device 100 wirelessly transmits the video signal input from the video reproduction device 26 via the connection cable 28. The video signal wirelessly transmitted by the wireless transmission device 100 is received by the wireless reception device 200. The wireless reception device 200 is connected to the video display device 36 by way of the connection cable 34. Thus, the video signal wirelessly transmitted from the wireless transmission device 100 to the wireless reception device 200 is input to the video display device 36 via the connection cable 34. When the video signal is input from the wireless reception device 200 to the video display device 36 through the connection cable 34, the video display device 36 displays the input video signal on the display screen.

(Function Configuration of Wireless Transmission Device 100)

Figure 7:
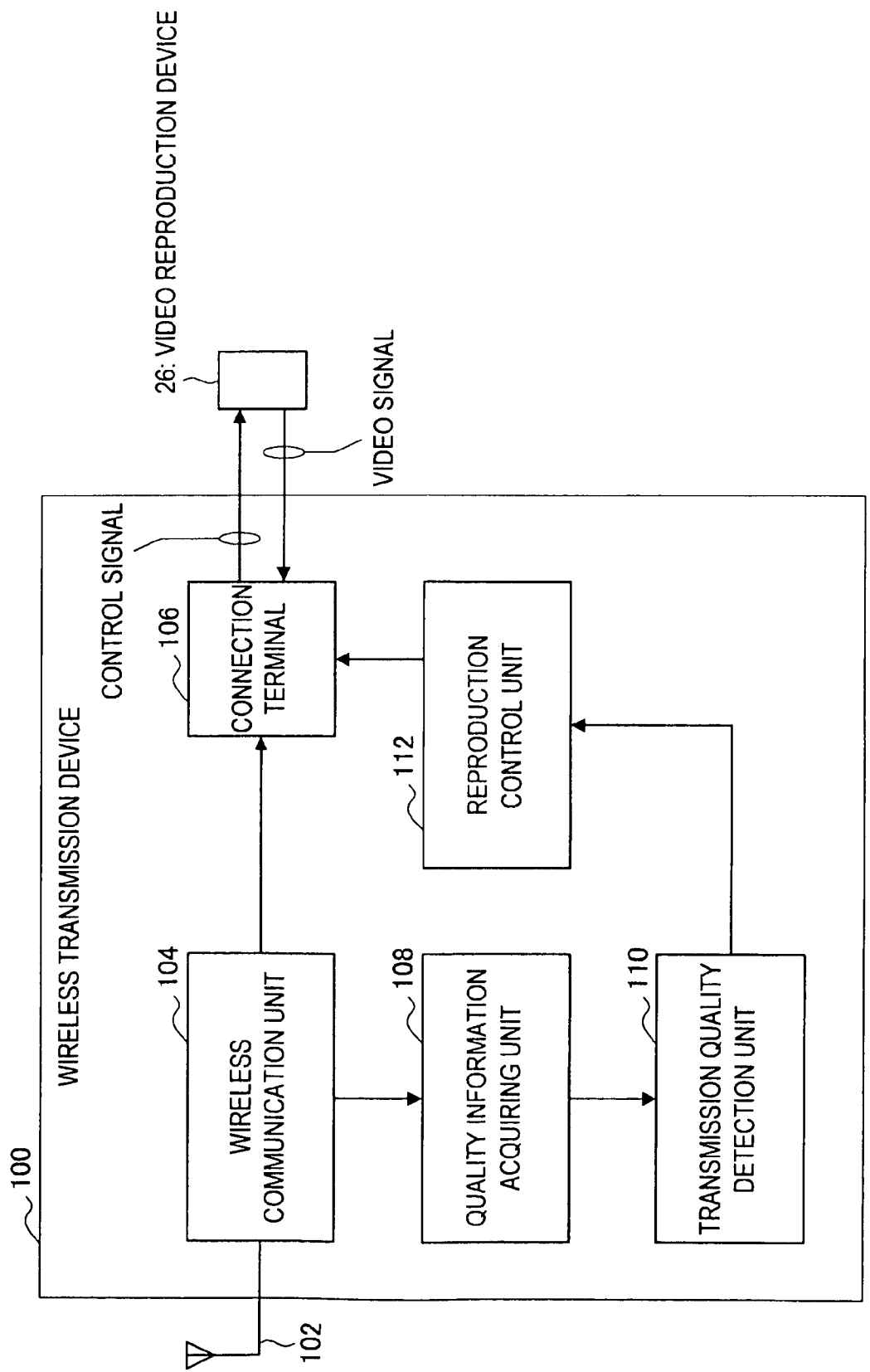
FIG. 7 shows a configuration example of a wireless transmission device according to the embodiment.

The function configuration of the wireless transmission device 100 according to the present embodiment will be described with reference to FIG. 7. FIG. 7 is an explanatory view showing a function configuration example of the wireless transmission device 100 according to the present embodiment.

As shown in FIG. 7, the wireless transmission device 100 mainly includes an antenna 102, a wireless communication unit 104, a connection terminal 106, a quality information acquiring unit 108, a transmission quality detection unit 110, and a reproduction control unit 112.

(1) Function Configuration Regarding Transmission Process of Video Signal

First, the function configuration regarding the transmission process of the video signal will be described. As described above, the video signal is input to the wireless transmission device 100 from the video reproduction device 26. In this case, the video signal output from the video reproduction device 26 is input through the connection cable 28 connected to the connection terminal 106. That is, the connection terminal 106 is a terminal to which the connection cable 28 for transmitting the video signal from the video reproduction device 26 is connected. The video signal input from the connection terminal 106 is input to the wireless communication unit 104. The video signal input to the wireless communication unit 104 is wirelessly transmitted to the wireless reception device 200 through the antenna 102. In this case, the video signal is modulated by the wireless communication unit 104, converted to a modulation signal for wireless transmission and then wirelessly transmitted.

(2) Function Configuration Regarding Reproduction Control of Video Data

The function configuration regarding the reproduction control of the video data will be described below. In the present embodiment, when the transmission quality of the wireless channel degrades, the reproduction process of the video data is controlled such that the video scene does not advance until the transmission quality recovers. The function regarding such reproduction control is mainly realized by the quality information acquiring unit 108, the transmission quality detection unit 110, and the reproduction control unit 112.

When the wireless transmission of the video signal from the wireless transmission device 100 to the wireless reception device 200 starts, the quality information acquiring unit 108 acquires the information (hereinafter referred to as quality information) regarding the transmission quality of the wireless channel through the wireless communication unit 104. The quality information contains information such as SNR (Signal to Noise Ratio) and BER (Bit Error Rate) detected by the wireless reception device 200. The quality information also contains information regarding the reproduction quality of the video data obtained by decoding the video signal received by the wireless reception device 200. The quality information may indicate good and bad of the transmission quality.

As described above, the quality information acquired by the quality information acquiring unit 108 is input to the transmission quality detection unit 110. The transmission quality detection unit 110 detects whether or not the transmission quality of the wireless channel is degraded based on the information contained in the quality information. For instance, if the quality information contains the information of the SNR, the transmission quality detection unit 110 determines whether or not the SNR contained in the quality information is lower than a predetermined value. If the quality information contains the information regarding the reproduction quality of the video data, the transmission quality detection unit 110 determines whether or not the reproduction quality of the video data is lower than a predetermined quality. Furthermore, if the quality information indicates good and bad of the transmission quality, the transmission quality detection unit 110 outputs the determination result based on the good and the bad of the transmission quality indicated in the quality information.

From such determination results, the transmission quality detection unit 110 judges that the transmission quality of the wireless channel is in a degraded state when the video signal is disturbed. When detected that the disturbance of the video signal is reduced or removed from the determination result, the transmission quality detection unit 110 judges that the transmission quality of the wireless channel is recovered. The judgment result of the transmission quality by the transmission quality detection unit 110 is input to the reproduction control unit 112. The reproduction control unit 112 controls the reproduction process of the video reproduction device 26 based on the judgment result of the transmission quality input from the transmission quality detection unit 110.

For instance, when the judgment result indicating the degradation of the transmission quality is input from the transmission quality detection unit 110 to the reproduction control unit 112, the reproduction control unit 112 transmits a reproduction stop request through the connection cable 28 connected to the connection terminal 106. The reproduction stop request is a control signal for causing the video reproduction device 26 to stop the reproduction process of the video data. When the reproduction stop request is transmitted from the reproduction control unit 112 to the video reproduction device 26, the reproduction of the video data by the video reproduction device 26 is stopped.

Thereafter, when the judgment result indicating the recovery of the transmission quality is input from the transmission quality detection unit 110 to the reproduction control unit 112, the reproduction control unit 112 transmits a reproduction start request through the connection cable 28 connected to the connection terminal 106. The reproduction start request is a control signal for causing the video reproduction device 26 to resume the reproduction process of the video data. When the reproduction start request is transmitted from the reproduction control unit 112 to the video reproduction device 26, the reproduction of the video data by the video reproduction device 26 is resumed.

As described above, the wireless transmission device 100 monitors the transmission quality of the wireless channel, detects that the transmission quality degraded, and stops the reproduction of the video data by the video reproduction device 26. Subsequently, when the transmission quality of the wireless channel is recovered, the wireless transmission device 100 detects that the transmission quality is recovered, and resumes the reproduction of the video data by the video reproduction device 26. Thus, since the reproduction control of the video data is executed according to the change in state of the transmission quality in the wireless channel, even if the switching of the frequency channel and the like is executed, the video scene will not advance during such execution period. As a result, after the transmission quality of the wireless channel is recovered, the reproduction can be performed from the video scene of the time point at which the transmission quality degraded without the user rewinding the video scene.

(Function Configuration of Wireless Reception Device 200)

Figure 8:
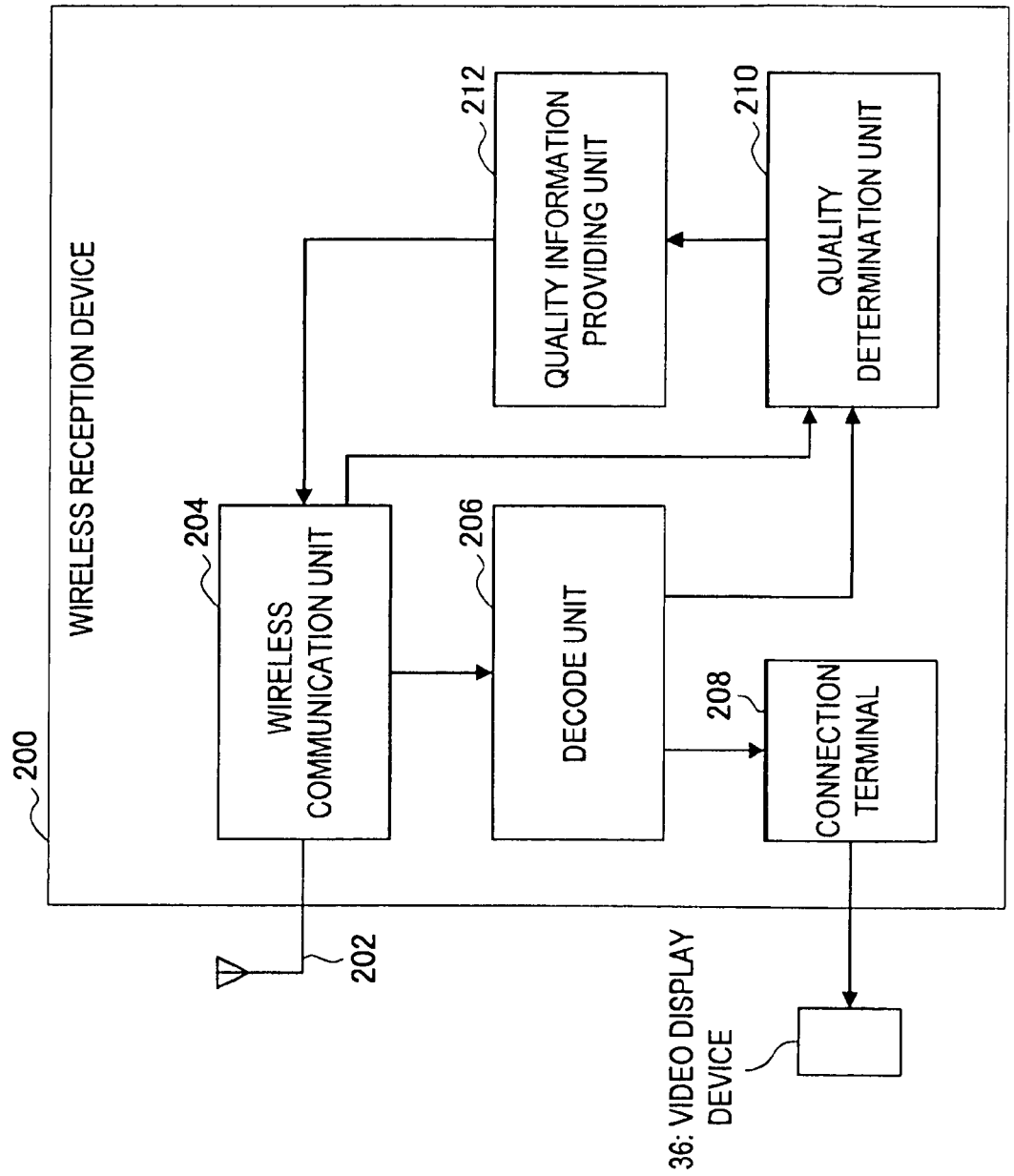
FIG. 8 shows a configuration example of a wireless transmission device according to the embodiment.

The function configuration of the wireless reception device 200 according to the present embodiment will be described with reference to FIG. 8. FIG. 8 is an explanatory view showing a function configuration example of the wireless reception device 200 according to the present embodiment.

As shown in FIG. 8, the wireless reception device 200 is configured by an antenna 202, a wireless communication unit 204, a decode unit 206, a connection terminal 208, a quality determination unit 210, and a quality information providing unit 212.

As described above, the video signal is wirelessly transmitted from the wireless transmission device 100 to the wireless reception device 200. The video signal is converted to a modulation signal for wireless transmission and wirelessly transmitted by the wireless transmission device 100. Thus, the modulation signal for wireless transmission received through the antenna 202 is demodulated to a video signal of before modulation by the wireless communication unit 204. In this case, the wireless communication unit 204 detects error information related to the transmission quality such as SNR and BER. For instance, the wireless communication unit 204 calculates the CRC (Cyclic Redundancy Check), and detects the BER.

The error information detected by the wireless communication unit 204 in this manner is input to the quality determination unit 210. The video signal demodulated by the wireless communication unit 204 is input to the decode unit 206. When the video signal is input from the wireless communication unit 204 to the decode unit 206, the decode unit 206 decodes the video signal and restores the video data. In this case, the decode unit 206 detects the error that occurred when decoding the video signal.

The error information detected by the decode unit 206 is input to the quality determination unit 210. The video data decoded by the decode unit 206 is input to the connection terminal 208. The video display device 36 is connected to the connection terminal 208 by way of the connection cable 34. Thus, the video data input to the connection terminal 208 is transmitted to the video display device 36 through the connection cable 34.

As described above, the quality determination unit 210 is input with the error information detected in time of signal reception by the wireless communication unit 204. Furthermore, the error information detected in time of decoding of the video signal by the decode unit 206 is input to the quality determination unit 210. The quality determination unit 210 generates the quality information regarding the transmission quality of the wireless channel based on such error information. For instance, the quality determination unit 210 generates the quality information indicating whether or not the BER input from the wireless communication unit 204 is lower than a predetermined value. The quality determination unit 210 also generates the quality information indicating whether or not the error rate input from the decode unit 206 is lower than a predetermined value.

If the quality can be determined from the BER or the decode error rate in the wireless transmission device 100, the quality determination unit 210 is configured to generate the quality information containing the error information such as the BER and the error rate as is. The quality information generated by the quality determination unit 210 is input to the quality information providing unit 212. When the quality information is input from the quality determination unit 210 to the quality information providing unit 212, the quality information providing unit 212 transmits the quality information towards the wireless transmission device 100 through the wireless communication unit 204.

As described above, the wireless reception device 200 receives the video signal from the wireless transmission device 100 and feeds back the error information detected when receiving the video signal to the wireless transmission device 100. The wireless reception device 200 feeds back the information of the decode error obtained when decoding the image signal received from the wireless transmission device 100 to the wireless transmission device 100. The transmission quality of the wireless channel then can be determined in the wireless transmission device 100 by feeding back the information from the wireless reception device 200 to the wireless transmission device 100.

The configuration of the video transmission system 50 according to the present embodiment, and the function configurations of the wireless transmission device 100 and the wireless reception device 200 included in the video transmission system 50 have been described above. In the video transmission system 50, the error information is fed back from the wireless reception device 200 to the wireless transmission device 100, and the reproduction process of the video reproduction device 26 is controlled by the wireless transmission device 100 based on such error information as described above. Thus, the reproduction process of the video data is stopped until the transmission quality is recovered even if the transmission quality of the wireless channel is lowered and the reproduction of the image is interrupted. When the transmission quality of the wireless channel is recovered and the video is again reproduced, the reproduction of the image starts from the video scene of the time point at which degradation of the transmission quality is detected. As a result, the video scene does not advance during the period in which the reproduction of the video is interrupted with the degradation of the transmission quality, and the user does not rewind the video scene a number of times.

[Flow of Transmission Process by Video Transmission System 50]

The flow of transmission process by the video transmission system 50 according to the present embodiment will be described below with reference to FIG. 9. FIG. 9 is an explanatory view showing the flow of transmission process by the video transmission system 50 according to the present embodiment.

As shown in FIG. 9, when the transmission process of the reproducing video starts, the video signal is transmitted from the video reproduction device 26 to the wireless transmission device 100. As described above, the video reproduction device 26 and the wireless transmission device 100 are wire connected by the connection cable 28. Thus, the video signal is not interrupted at this stage. That is, the video signals (video signal (1), video signal (2)) are continuously transmitted from the video reproduction device 26 to the wireless transmission device 100, as shown in FIG. 9.

When the video signal is transmitted from the video reproduction device 26 to the wireless transmission device 100, the wireless transmission device 100 wirelessly transmits the video signal to the wireless reception device 200. The wireless transmission device 100 is continuously input with the video signals (video signal (1), video signal (2)), as described above. Thus, since the transmission quality of the wireless channel is satisfactory, the video signals (video signal (1), video signal (2)) are continuously wirelessly transmitted between the wireless transmission device 100 and the wireless reception device 200 at this stage.

However, in the example of FIG. 9, the transmission quality of the wireless channel is degraded at the stage before the video signal (3) is transmitted from the wireless transmission device 100. When such degradation of the transmission quality is detected (S1), the wireless reception device 200 wirelessly transmits the quality information (notification of degradation) to the wireless transmission device 100 (S2). The frequency channel between the wireless transmission device 100 and the wireless reception device 200 is also switched. In this case, the wireless reception device 200 transmits the switch start notification to the video display device 36 (S4).

The switch start notification is a state notification signal for notifying that the switch of the frequency channel started. When the switch start notification is transmitted from the wireless reception device 200 to the video display device 36, the information indicating that the frequency channel is being switched is displayed on the display screen at the video display device 36. The user can recognize that the video signal has not reached the wireless reception device 32 by displaying such information at the video display device 36.

When the quality information (notification of degradation) is transmitted from the wireless reception device 200 to the wireless transmission device 100, the reproduction stop request is transmitted from the wireless transmission device 100 to the video reproduction device 26 (S3). The reproduction stop request is a control signal for causing the video reproduction device 26 to stop the reproduction process of the video data. When the reproduction stop request is acquired from the wireless transmission device 100, the video reproduction device 26 stops the reproduction process of the video data. The switching process of the frequency channel is executed by the wireless reception device 200 while the reproduction process of the video data is stopped (S5).

After the switching process to the frequency channel having satisfactory channel characteristics is completed and the recovery of the transmission quality by the wireless reception device 200 is detected (S6), the quality information notification (notification of recovery) is wirelessly transmitted from the wireless reception device 200 to the wireless transmission device 100 (S7). The wireless transmission device 100 receives the quality information notification (notification of recovery) from the wireless reception device 200, and transmits the reproduction start request to the video reproduction device 26 (S8). The reproduction start request is a control signal for causing the video reproduction device 26 to resume the reproduction process of the video data. Thus, when acquiring the reproduction start request from the wireless transmission device 100, the video reproduction device 26 resumes the reproduction process of the video data.

When the recovery of the transmission quality is detected by the wireless reception device 200 (S6), the switch complete notification is transmitted from the wireless reception device 200 to the video display device 36 (S9). The switch complete notification is a state notification signal for notifying that the switch of the frequency channel is completed. At this stage, the video signal (video signal (3)) is transmitted from the wireless transmission device 100 to the wireless reception device 200 using the frequency channel having satisfactory channel characteristics. The video signal transmitted from the wireless transmission device 100 to the wireless reception device 200 is transmitted from the wireless reception device 200 to the video display device 36.

After the switch complete notification is transmitted from the wireless reception device 200 to the video display device 36, the video display device 36 cancels the display of the information indicating that the channel is being switched, and displays the video signal transmitted from the wireless reception device 200 on the display screen. Thereafter, the video signal reproduced by the video reproduction device 26 is continuously transmitted to the video display device 36 through the wireless transmission device 100 and the wireless reception device 200 if the transmission quality of the wireless channel is satisfactory. If the transmission quality of the wireless channel degrades, the frequency channel used for the wireless transmission between the wireless transmission device 100 and the wireless reception device 200 is switched, similar to the above. In this case, the reproduction process of the video data is controlled, similar to the above.

As described above, the reproduction process of the video data is stopped until the transmission quality is recovered even if the transmission quality of the wireless channel is lowered and the reproduction of the video is interrupted. When the transmission quality of the wireless channel is recovered and the video is again reproduced, the reproduction of the video starts from the video scene of the time point at which degradation of the transmission quality is detected. As a result, the video scene does not advance during the period in which the reproduction of the video is interrupted with degradation of the transmission quality, and the user does not view while rewinding the video scene over a number of times.

(Remark)

The video signal may be compressed or uncompressed. The frequency band such as 2.4 GHz, 5 GHz, 60 GHz, and FM is used for the wireless transmission of the video signal. The present embodiment is not limited to such frequency band, and may be applied to the wireless transmission using an arbitrary frequency band. A control command for a remote controller, a CEC command (e.g., DECK CONTROL or PLAY) of HDMI standard, and the like may be used for the reproduction control of the video reproduction device 26. When using the control command for the remote controller, the wireless transmission device 100 may use infrared communication, RF communication and the like to control the video reproduction device 26. A dedicated command for controlling the video reproduction device 26 from the wireless transmission device 100 may be used.

[Hardware Configuration Example (Wireless Transmission Device 100, Wireless Reception Device 200)]

The function of each component of the device can be realized using a computer program for realizing such function by the information processing device having the hardware configuration shown in FIG. 10. FIG. 10 is an explanatory view showing the hardware configuration of the information processing device capable of realizing the function of each component of the device. The mode of the information processing device is arbitrary, and includes modes of portable information terminal such as personal computer, portable telephone, PHS (Personal Handy-phone System), and PDA (Personal Digital Assistant), game machine, or various information home electronics.

As shown in FIG. 10, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removable recording medium 928 such as a magnetic disk, an optical disk, a magnetooptical disk, or a semiconductor memory or writes information in the removable recording medium 928. The removable recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removable recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, a SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

[Conclusion]

Lastly, the function configuration of the video transmission apparatus and the video transmission system according to the present embodiment, and the effects obtained by the function configuration will be briefly summarized below. The wireless transmission device 100 is an example of the video transmission apparatus. The video transmission system 50 is an example of the video transmission system.

The video transmission apparatus according to the present embodiment can be represented in the following manner. The video transmission apparatus includes the connection terminal, the wireless transmission unit, the transmission quality detection unit, and the reproduction control unit. The connection terminal 106 is an example of the connection terminal. The wireless communication unit 104 is an example of the wireless transmission unit. The transmission quality detection unit 110 is an example of the transmission quality detection unit. The reproduction control unit 112 is an example of the reproduction control unit.

The video reproduction device is connected to the connection terminal. The wireless transmission unit wirelessly transmits the video signal input through the connection terminal. Furthermore, the transmission quality detection unit detects the transmission quality of when wirelessly transmitted by the wireless transmission unit. The reproduction control unit controls the video reproduction device to stop the reproduction of the video when degradation of the transmission quality is detected, and resumes the reproduction of the video when the transmission quality is recovered. Thus, the video transmission apparatus can wirelessly transmit the video signal by the wireless transmission unit.

Furthermore, degradation of the transmission quality of the wireless channel by the transmission quality detection unit and the recovery of the transmission quality can be detected. Moreover, the reproduction process of the video data is controlled by the reproduction control unit according to the state of the transmission quality detected in the transmission quality detection unit. For instance, during the period in which the video signal is not wirelessly transmitted by the degradation of the transmission quality, the reproduction process of the video data is stopped, and the reproduction process of the video data is resumed after the recovery of the transmission quality. As a result, the user can continuously view from the video scene of before the video is interrupted without rewinding and reproducing the video scene after the transmission quality is recovered even if the video is interrupted with the degradation of the transmission quality.

The video transmission apparatus may further include a quality information acquiring unit for acquiring information of the transmission quality detected at a wireless transmitting destination of the video signal from the wireless transmitting destination. In this case, the transmission quality detection unit detects the transmission quality based on the information of the transmission quality acquired by the quality information acquiring unit. A method of detecting the transmission quality of the wireless channel includes using the information of the transmission quality detected at the wireless transmitting destination of the video signal and using the information of the transmission quality detected on the side of the video transmission apparatus. In the present embodiment, either method may be used. However, when the method of detecting the information of the transmission quality at the wireless transmitting destination is used, the transmission quality can be determined based on the error information obtained by decoding the video signal at the wireless transmitting destination.

The quality information acquiring unit acquires the information indicating quality degradation when the transmission quality degrades to lower than a predetermined quality, and acquires the information indicating quality recovery when the transmission quality recovers to higher than or equal to the predetermined quality. If the quality information directly indicating degradation or recovery of the transmission quality is acquired, the reproduction control is merely executed based on the quality information. If the error information is acquired as the quality information from the wireless transmitting destination, the degradation or the recovery of the transmission quality is determined based on the error information, and the reproduction control is executed based on the determination result.

However, in which format to have the quality information is a matter appropriately selected according to the configuration of the video transmission apparatus and the device of the wireless transmitting destination, and the embodiment. For instance, if the CPU capable of performing high speed calculation process is mounted on the video transmission apparatus, the determination process of the transmission quality is preferably executed by the video transmission apparatus. If the CPU capable of performing high speed calculation process is mounted at the wireless transmitting destination, the determination process of the transmission quality is preferably executed at the wireless transmitting destination.

The quality information acquiring unit acquires information indicating the quality degradation when video quality of after decoding is lower than a predetermined quality at the wireless transmitting destination of the video signal, and acquires information indicating the quality recovery when the video quality of higher than or equal to the predetermined quality is recovered. As described above, BER, SNR, and the like may be used for the determination of the transmission quality, but the video quality of the video obtained by decoding the video signal may be set as the reference.

Actually, the viewing is often not inhibited even if the video is slightly disturbed. Such disturbance of the video is not necessarily determined by the magnitude of the communication error rate. For instance, in the case of the video scene in which movement is few, the differential information between frames is mainly transmitted for the video signal, and thus the influence on the video of after decoding is small even if the communication error rate is high. On the contrary, in the video in which movement is hard or the video in which scene change and the like occurs, the disturbance of the video may occur although the communication error rate is low. Therefore, the chance that the display of the video is interrupted can be reduced by determining the transmission quality with the video quality of after decoding as a reference and performing the reproduction control based on the determination result.

The transmission quality may be determined based on an error rate in time of demodulation or in time of decoding detected at a transmitting destination of the video signal. The reference used in the determination of the transmission quality may be changed or a plurality of references may be used in combination depending on the type of video data and bit rate. The technique according to the present embodiment can be variously extended as described above.

The following video transmission system can be configured using the video transmission apparatus. The video transmission system includes the video transmission apparatus and the video reception device.

A video transmission apparatus includes a connection terminal to which a video reproduction device is connected, a wireless transmission unit for wirelessly transmitting a video signal input through the connection terminal, a quality information acquiring unit for acquiring quality information indicating wireless transmission quality of the video signal, and a reproduction control unit for controlling the video reproduction device to stop the reproduction of the video when degradation of the transmission quality is detected and to resume the reproduction of the video when the transmission quality is recovered based on the quality information acquired by the quality information acquiring unit A video reception device includes a wireless reception unit for receiving the video signal wirelessly transmitted from the video transmission apparatus, a decode unit for decoding the video signal received by the wireless reception unit, a quality determination unit for determining video quality of the video signal decoded by the decode unit, and a quality information providing unit for providing the determination result of the quality determination unit as the quality information. According to such configuration, the video scene does not advance during the period in which the reproduction of the video is interrupted with the degradation of the transmission quality, and the user does not view while rewinding the video scene a number of times.

It should be understood by those skilled in the art that various modifications, combinations, sub-combinations and alterations may occur depending on design and other factors insofar as they are within the scope of the appended claims or the equivalents thereof.

What is claimed is:

1. A video transmission system comprising:
a video transmission apparatus including,
a connection terminal to which a video reproduction device is connected,
a wireless transmission unit for wirelessly transmitting a video signal input through the connection terminal,
a quality information acquiring unit for acquiring quality information indicating wireless transmission quality of the video signal, and
a reproduction control unit for controlling the video reproduction device to stop the reproduction of the video when degradation of the transmission quality is detected and to resume the reproduction of the video when the transmission quality is recovered based on the quality information acquired by the quality information acquiring unit; and
a video reception device including,
a wireless reception unit for receiving the video signal wirelessly transmitted from the video transmission apparatus and determining video quality of the video signal based on error information detected in time of demodulation of the video signal,
a decode unit for decoding the video signal received by the wireless reception unit,
a quality determination unit for determining video quality of the video signal decoded by the decode unit, and a quality information providing unit for providing the determination result of the quality determination unit as the quality information;

wherein the video transmission apparatus includes a transmission quality detection unit to determine the transmission quality based on the error information detected in time of demodulation of the video signal and a result of a determination of influence of an error rate indicated by the error information detected in time of demodulation of the video signal on the video quality of after decoding at the video reception device of the video signal set to be used as a reference in the determination of the transmission quality, wherein the reference to be used in the determination of the transmission quality is changed depending on type of video data of the video signal.

* * * * *